Nov. 29, 1966          P. WITT          3,288,578

VALVED SAFETY DEVICE

Filed May 20, 1964          3 Sheets-Sheet 1

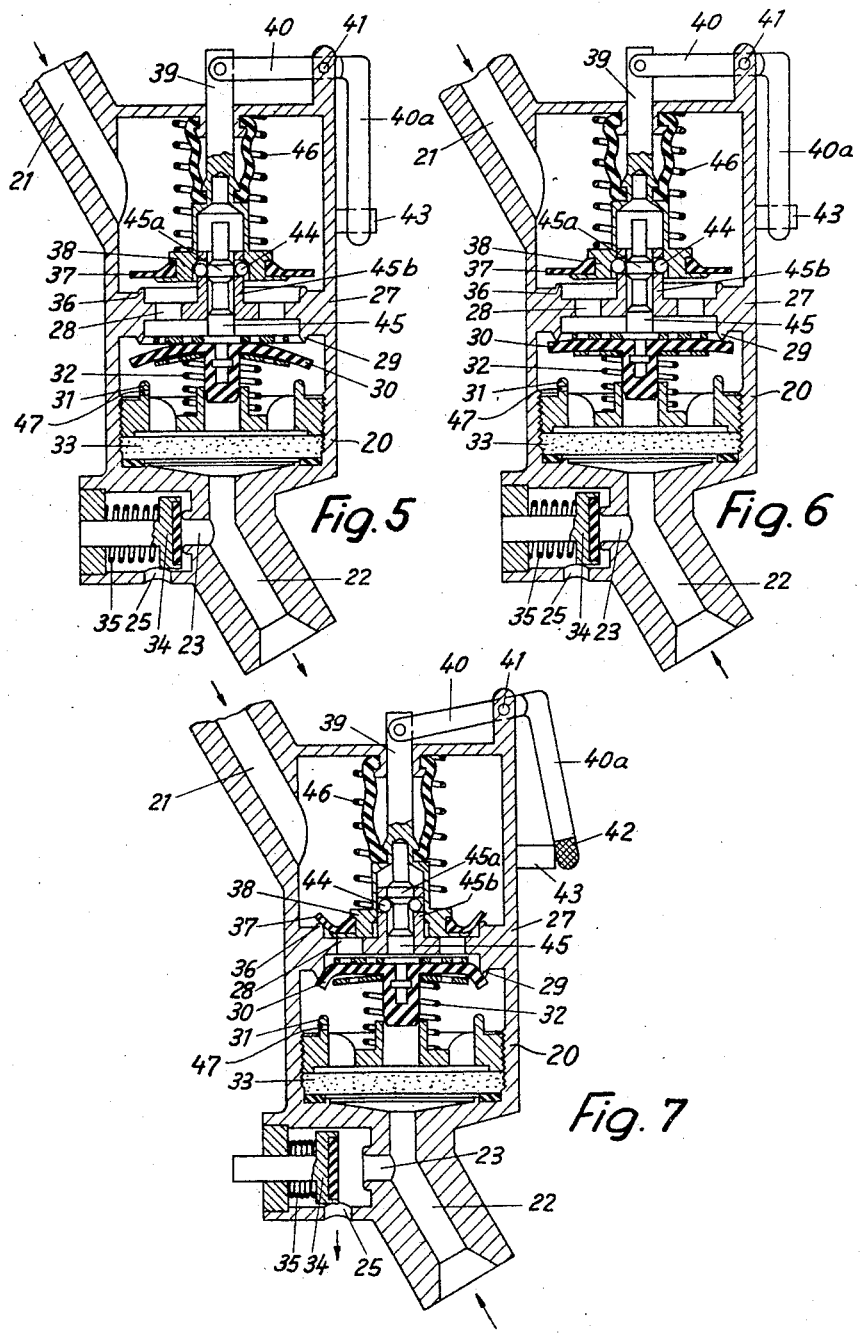

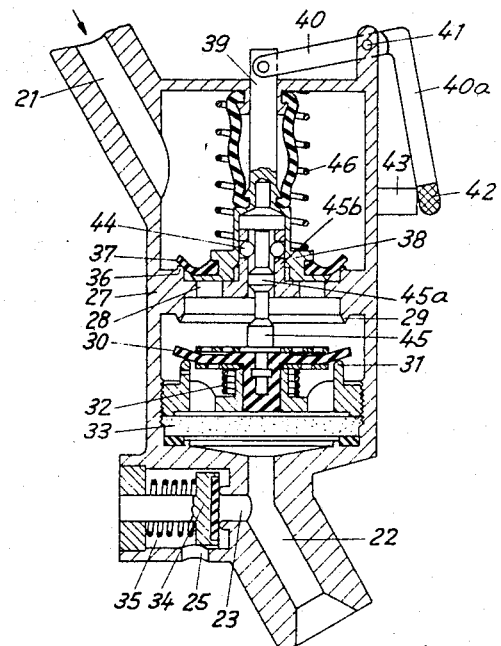
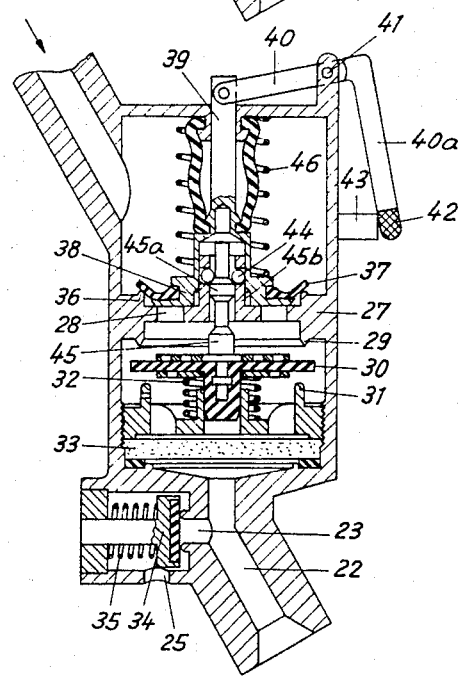

United States Patent Office 3,288,578
Patented Nov. 29, 1966

3,288,578
VALVED SAFETY DEVICE
Paul Witt, Witten-Annen, Germany, assignor to Tespa AG., Zurich, Switzerland, a corporation of Switzerland
Filed May 20, 1964, Ser. No. 368,894
5 Claims. (Cl. 48—192)

This invention relates to a combination safety device for preventing the formation of explosive gas mixtures and the further development of explosions in burner gas pipes.

The commonest type of safety device is a combination of different components, such as a flame trap, a back-pressure check valve, an excess-pressure relief valve and an automatic cut-off. These components are capable of fulfilling certain functions, such as preventing the flow-back of back-pressure or flash-back into the supply system preventing the build-up of pressure causing bursts in flexible tubing, and shutting-off the supply of fresh gas after an explosion or any substantial back-flow of gas or oxygen. However, none of the existing forms of safety device is capable of providing protection by stopping the continued supply of fresh gas when a flexible tubing breaks or becomes detached from its source of supply.

It is accordingly an object of the present invention to provide a combination safety device which allows for this last-mentioned contingency.

Another object of the invention is to provide a safety device having a back-pressure check valve which functions as a flow-control valve in such a way that it acts not only when the maximum permissible rate of gas supply is exceeded but also when the excess-pressure relief valve responds to a flash-back.

A further object of the invention is to provide a check valve in a safety device which operates so as to prevent a prescribed maximum rate of gas consumption from being exceeded.

Yet another object of the invention is the provision of an excess-pressure relief valve which is self-locking in its open position.

These and other objects of the invention will be made apparent by the following description of two examples of safety devices in accordance with the invention, the safety devices being illustrated in the accompanying drawings, in which:

FIGURE 5 is a second form of safety device in normal operational conditions permitting the passage therethrough of gas;

FIGURE 6 is the device shown in FIGURE 5 under a slight back-pressure of gas, amounting to say 50 mm. water column;

FIGURE 7 shows the device according to FIGURE 5 after a flash-back explosion and the build-up of back pressure to about 1200 mm. water column;

FIGURE 8 is the device according to FIGURE 5 when the rate of gas supply is excessive; and FIGURE 9 is the device according to FIGURE 5 when the gas pressure has fallen to normal.

Figure 1:
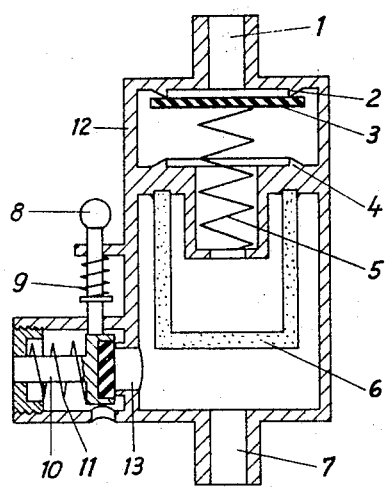
FIGURE 1 is a section through one form of safety device in an inoperative position in which it prevents return flow of gas.
Figure 2:
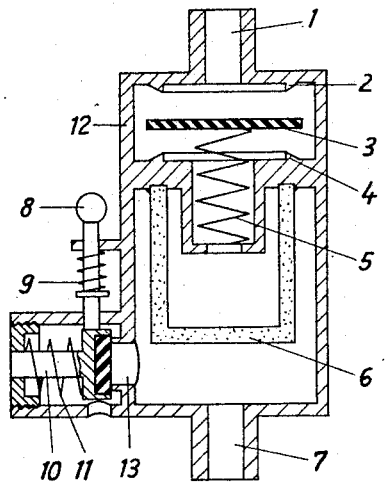
FIGURE 2 is the device illustrated in FIGURE 1 when gas is being consumed.

The combination safety device illustrated in FIGURES 1 to 4 comprises a casing 12 with an inlet 1 and an outlet 7, the inlet and outlet being separated by a flame trap 6 consisting, for example, of sintered metal. A valve disc 3 is arranged to co-operate with two valve seats 2 and 4, a spring 5 normally urging the disc against the upper seat 2. A third outlet 13 is normally kept closed by an excess-pressure relief valve 10 urged into a closed position by a spring 11. A pin 8 loaded by a spring 9 is adapted to retain the valve 10 in an open position should the valve disc be forced fully open by the back-pressure of an explosion.

In the inoperative position of the device (FIGURE 1), the valve disc 3 is urged by the thrust of the spring 5 into contact with the seat 2. The valve 10 is likewise kept closed by the thrust of the spring 11. This position of the valve elements 3 and 10 also applies if a slight back-pressure of gas should arise. In such a case the pressure in the outlet 7 and in the entire safety valve casing would exceed the pressure on the inlet side 1 of the safety device. However, if the maximum permissible pressure on the outlet side 7 is exceeded, the valve 10 is forced open against the resistance of its spring 11 and permits this pressure build-up to be released to the outside. As soon as the pressure has been thus reduced to below the maximum permissible level, the valve 10 is closed again by its spring 11.

Figure 3:
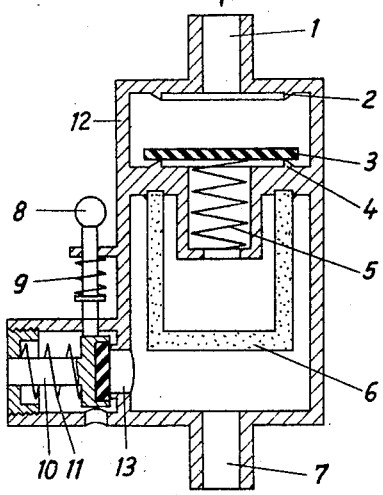
FIGURE 3 is the device illustrated in FIGURE 1 in a closed position after fracture of a flexible tube.
Figure 4:
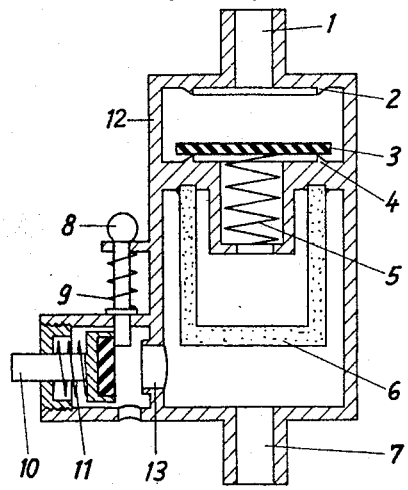
FIGURE 4 is the device illustrated in FIGURE 1 after having closed as the result of an explosion.

When gas is being consumed at a normal rate (FIGURE 2), the gas flows through the safety device in the direction of the arrows. The valve disc 3 is lifted off its seat 2 against the resistance of its spring 5 by the pressure of the gas in the supply mains, and the disc remains floating between the two seats 2 and 4 without making sealing contact with either. The gas passes through the flame trap 6, and then through the outlet 7 to the point where it is being consumed. Consequently, the valve 10 remains closed so long as the maximum operational pressure permitted by the safety device is not exceeded. If however a flexible pipe connection (not shown) fitted to the outlet should fracture or detach itself from its connections, the gas leaving through the outlet 7 will issue directly into the ambient atmosphere. The rate of flow of the gas through the safety device would therefore rise sufficiently for the valve disc 3 to be forced against the seat 4 and the resistance of spring 5 to be overcome (FIGURE 3). The further supply of fresh gas would thus be stopped, and in such an eventuality the valve 10 remains closed.

Should there be an explosion or flash-back, the exploding gas mixture will produce a high back-pressure surge through the outlet 7 into the interior of the safety valve, the pressure surge acting against the external walls of the flame trap 6. The pressure of the exploding gas mixture forces the gas through the walls of the trap 6, but in passing through the trap the gas mixture loses sufficient heat to prevent reignition inside the trap 6. The pressure build-up inside the trap 6 is nonetheless sufficient to force the valve disc 3 hard against its seat 2. At the same time, the valve 10 is abruptly forced fully open against its spring 11 and is immediately retained in the fully open position by the descent of the pin 8 which is thrust downwardly by its spring 9 to abut against the face of the valve disc 10. When the pressure of the explosion has been thus relieved, the valve disc 3 is again lifted off its seat 2 against the resistance of the spring 5 by the pressure of the fresh gas supply. This gas passes through the flame trap but then escapes directly to the outside through the open relief valve 10. The rate of flow of this gas is therefore high enough to urge the valve disc 3 back again into contact with the seat 4 in which position it stops the further flow of fresh gas through the safety device.

Before normal operating conditions can be restored, the pin 8 has to be manually retracted against the resistance of its spring 9 so as to allow the spring 11 to re-close the open pressure-relief valve 10. Following therefore any fracture of the flexible tube connected to the outlet 7, as well as after an explosion, the valve disc 3 is always forced by the gas supply pressure on to the seat 4. In order to restore the safety valve to its normal operating condition, the pressure in the entry 1 of the safety device must be lowered sufficiently for the thrust of the spring 5 to lift the valve disc 3 off the seat 4 and to raise it into contact with the seat 2.

The combination safety device shown in FIGURES 5 to 9 likewise comprises a casing 20 with an inlet 21 and an outlet 22. An additional outlet 23 contains an excess-pressure relief valve 34 similar to the one shown in FIGS. 1 to 4 and normally held in a closed position by a spring 35. The casing is divided by a partition 27 traversed by channels 28. Below the partition 27 is a valve seat 29 for the valve disc 30 of a back-pressure check valve which corresponds to the valve disc 3 in the device shown in FIGURES 1 to 4. The valve disc 30 can also co-operate with a valve seat 31, so that the valve functions as a back-pressure check valve by co-operating with the seat 29, and as a flow-control valve adapted to co-operate with the seat 31. A spring 32 normally urges the valve disc 30 upwards into sealing contact with the seat 29, the valve disc itself being of flexible construction. It may consist, for example, of rubber stiffened by reinforcing backing plates on each side, the backing plates being of smaller diameter than the disc itself. The base of the casing contains a plate-shaped flame trap 33 made, for example, of sintered metal.

A further valve seat 36 is provided at the top of the partition 27 and co-operates with a valve disc 37. These parts 36, 37 constitute a gas inlet valve which is normally open. The valve disc 37 is likewise flexible, consisting for example, of rubber. The valve disc 37 is attached to a hollow piston 38 with a solid upper extension 39. Articulated to the top of the extension is a bell-crank lever 40 hinged on a pin 41 at the top of the casing 20. The bottom end 42 of the lever arm 40a is coloured, for instance with red paint. This coloured tip 42 is normally hidden between the blades of a fork 43.

In normal operation the piston 38 is supported by balls 44 which rest on a collar 45b projecting from the partition 27. Further, a stem 45 with a bulbous annulus 45a of enlarged diameter is attached to the valve disc 37 and projects into the interior of the hollow piston 38. Normally this bulbous annulus 45a, as shown in FIGURES 5 and 6, is level with the balls 44 which are therefore urged outwards so as to keep the piston 38 and the valve disc 37 in the open position as shown in FIGURES 5 and 6. A spring 46 urges the piston 38 towards the partition 27, and the valve disc 37 towards its seat 36.

In operation gas under pressure enters the safety device through the inlet 21 and passes through the passages 28 to the outlet 22. The pressure of the gas deflects the peripheral portion of the valve disc 30, lifting the said portion of the disc off its seat 29. However, any back pressure of gas causes the valve disc 30 to be pressed tightly on to its seat 29. If the back pressure exceeds about 1200 mm. water column, or if a flash-back explosion occurs, the valve disc is pressed against its seat 29 so tightly (see FIGURE 7) that the centre of the flexible disc pushes the stem 45 upwards. The bulbous annulus 45a then releases the balls 44 which are urged inwards against the thinner part of the stem 45 by the spring-loaded piston 38, thus permitting the valve disc 37 to drop on to its seat 36 and to cut off the further supply of fresh gas. At the same time, the pressure relief valve 34 is opened and the back pressure relieved through the outlet openings 23, 25. The lever 40 is at the same time deflected into the position shown in FIGURE 7, displaying its red warning tip 42. As soon as the causes of the back pressure have been removed, the lever arm 40a can be restored to its normal position (FIGURES 5 and 6) and the valve disc 37 re-opened.

The greater the rate of gas flow through the safety device, the further will the valve disc 30 be pushed off its seat 29 towards the seat 31, the rate of flow of the gas through the valve being thus limited. For example, assuming that a pipe fracture on the downstream side of the device has occurred and the rate of flow through the device has therefore become excessively high, then the valve disc 30 is pushed into actual contact with the seat 31. The valve stem 45 is thus pulled downwards, and the bulbous annulus 45a descends below the balls 44, permitting them to be displaced inwards against the thinner part of the stem 45 and thus to release the piston 38 as well as the disc 37. The spring 46 can therefore now thrust the valve disc 37 on to its seat 36, interrupting the further supply of fresh gas (see FIGURE 8). A small bleed passage or channel 47 in the lip of the seat 31 allows the pressures on both sides of the disc 30 to equalise slowly. When this has occurred, the spring 32 returns the valve disc 30 upwards into the position shown in FIGURE 9. However, the balls 44 bearing against the top of the bulbous annulus 45a prevent the disc 30 from being restored into its position of rest, as shown in FIGURE 6. The lever arm 40a has first to be pushed back into its fork before the safety device is ready again for resumed operation.

The flame traps 6 and 33 shown in the two safety devices described above can be made of various materials, including glass, vitreous materials, glass fiber and synthetic plastic materials.

I claim:

1. A combination safety device for preventing the formation of explosive gas mixtures and the further development of explosions in burner gas pipes, comprising a housing, a gas inlet and a spaced gas outlet in said housing, a flame trap arranged within said housing between said inlet and said outlet, an excess-pressure relief opening leading out of said housing on that side of said flame trap closer to said outlet, an excess-pressure relief valve in said relief opening, a back-pressure check valve arranged within said housing on that side of said flame trap closer to said inlet, said check valve comprising a movable double-acting check valve element, a further valve controlling the flow of gas through said inlet, locking means arranged to lock said further valve in an opening position, means operatively connecting said check valve element with said locking means whereby said check valve element is adapted to trigger the release of said locking means, and two valve seats for said check valve element whereby said valve element is arranged to close on one seat in one direction of gas-flow and to close on the other valve seat in the opposite direction of gas-flow.

2. A combination safety device as claimed in claim 1, wherein said locking means for said gas inlet valve includes a stem carried by said check valve and a releasable connection between said stem and gas inlet valve arranged to be released by said check valve element when said check valve element is seated on either of said two valve seats.

3. A combination safety device as claimed in claim 1, wherein said gas inlet valve is restorable to its normal open position by a lever hinged to the outside of said housing and operatively connected to said gas inlet valve by a pivotal connection with an extension on said gas inlet valve.

4. A combination safety device as claimed in claim 1, wherein one of said valve seats for said back-pressure check valve element is provided with a bleed passage whereby pressures above and below said valve element are equalised after a predetermined time period when said valve element makes sealing contact with said one valve seat.

5. A combination safety device for preventing the formation of explosive gas mixtures and the further development of explosions in burner gas pipes, comprising a housing, a gas inlet and a spaced gas outlet in said housing, a flame trap arranged within said housing between said inlet and said outlet, an excess-pressure relief opening leading out of said housing on that side of said flame trap closer to said outlet, an excess-pressure relief valve in said relief opening, a back-pressure check valve arranged within said housing on that side of said flame trap closer to said inlet, said check valve comprising a movable double-acting check valve element, two valve seats for said check valve element whereby said valve element is arranged to close on one valve seat in one direction of gas-flow and to close on the other valve seat in the opposite direction of gas-flow, and locking means for said excess-pressure relief valve to retain said relief valve in an open position when said relief valve has been fully opened.

References Cited by the Examiner

UNITED STATES PATENTS 1,311,774   7/1919   Ritter _____ 48—192 X

FOREIGN PATENTS 1,093,756   12/1960   Germany.
375,998   7/1932   Great Britain.

MORRIS O. WOLK, *Primary Examiner.*
JAMES H. TAYMAN, Jr., *Examiner.*